US009533915B2

(12) United States Patent
Johnson et al.

(10) Patent No.: US 9,533,915 B2
(45) Date of Patent: Jan. 3, 2017

(54) METHOD AND APPARATUS FOR PROCESSING OPTICAL FIBER UNDER MICROGRAVITY CONDITIONS

(71) Applicants: Michael David Johnson, Houston, TX (US); Raymond Andrew Motes, Rio Rancho, NM (US)

(72) Inventors: Michael David Johnson, Houston, TX (US); Raymond Andrew Motes, Rio Rancho, NM (US)

( * ) Notice: Subject to any disclaimer, the term of this patent is extended or adjusted under 35 U.S.C. 154(b) by 0 days.

(21) Appl. No.: 14/511,898

(22) Filed: Oct. 10, 2014

(65) Prior Publication Data
US 2015/0104138 A1   Apr. 16, 2015

Related U.S. Application Data

(60) Provisional application No. 61/961,304, filed on Oct. 10, 2013.

(51) Int. Cl.
| | |
|---|---|
| *G02B 6/02* | (2006.01) |
| *C03C 25/00* | (2006.01) |
| *G02B 1/00* | (2006.01) |
| *C03B 37/15* | (2006.01) |
| *C03B 37/10* | (2006.01) |
| *C03B 37/022* | (2006.01) |
| *C03B 37/023* | (2006.01) |
| *C03B 37/026* | (2006.01) |

(52) U.S. Cl.
CPC ............ *C03C 25/002* (2013.01); *C03B 37/15* (2013.01); *G02B 1/00* (2013.01); *C03B 37/022* (2013.01); *C03B 37/023* (2013.01); *C03B 37/026* (2013.01); *C03B 37/10* (2013.01); *C03B 2201/82* (2013.01); *C03B 2201/86* (2013.01); *C03B 2201/88* (2013.01)

(58) Field of Classification Search
CPC ... G02B 1/00; C03B 2201/82; C03B 2201/86; C03B 2201/88; C03B 25/002; C03B 37/15
USPC .............................. 385/123, 125, 126; 65/385
See application file for complete search history.

(56) References Cited

U.S. PATENT DOCUMENTS

| | | | | | |
|---|---|---|---|---|---|
| 4,372,767 | A | * | 2/1983 | Maklad ............................. | 65/412 |
| 4,764,194 | A | * | 8/1988 | Maklad ............................. | 65/393 |
| 4,874,222 | A | * | 10/1989 | Vacha ................... | C03C 13/042 |
| | | | | | 385/141 |
| 4,938,562 | A | * | 7/1990 | Vacha et al. ................... | 385/142 |
| 5,991,486 | A | * | 11/1999 | Braglia ......................... | 385/123 |
| 6,374,641 | B1 | * | 4/2002 | Chu .................. | C03B 37/01205 |
| | | | | | 65/385 |
| 7,848,606 | B1 | * | 12/2010 | LaPointe et al. ............. | 385/123 |
| 9,069,117 | B1 | * | 6/2015 | Ballato et al. | |

FOREIGN PATENT DOCUMENTS

| | | | | | |
|---|---|---|---|---|---|
| JP | 6-194551 | * | 7/1994 | ............... | G02B 6/44 |
| WO | WO 89/08272 | * | 9/1989 | ............... | G02B 6/00 |

OTHER PUBLICATIONS

"Effect of gravity on ZBLAN glass crystallization" by Tucker et al, Annual NY Academy of Sciences, vol. 1027, pp. 129-137, 2004.*
"Advantages of drawing crystal-core fibers in microgravity" by Shlichta et al, SPIE vol. 1557, pp. 10-23, 1991.*
"Glass formation in microgravity" by Ray et al, Proceeding of Material Research Society Symposium, vol. 87, pp. 239-251, 1987.*
"Eliminating Crystals in Non-Oxide Optical Fiber Preforms and Optical Fibers" by Tucker et al, Recent Patents on Space Technology, vol. 2, No. 2, pp. 108-115, Sep. 2012.*
"Crystallization", Wikipedia article available online since at least Nov. 16, 2012.*
"Effects of microgravity on ZBLAN optical fibers utilizing a sounding rocket" by Tucker et al, SPIE Proceedings, vol. 2809, pp. 23-32, 1996.*
"Effects of microgravity on crystallization of ZBLAN optical fibers" by Tucker et al, AIAA Conference, paper 95-3784, pp. 1-8, 1995.*
"Study of the effect of gravity on ZBLAN glass as a commercial program" by Workman et al, AIAA Conference, paper 98-0812, pp. 1-6, 1998.*
"Current status of the ZBLAN microgravity project" by Workman et al, AIAA Conference, paper 99-16775, pp. 1-8, 1999.*
"Reduced gravity ZBLAN optical fiber pulling" by Tucker et al, AIAA Conference, paper 2000-0945, pp. 1-4, 2000.*
Elay, Serena; Englund, Dirk; Ferguson, John; Jewell, Joseph; Stick, Daniel; Wozny, Nathan; Final Report: Optical Properties of ZBLAN Microspheres Produced in Microgravity; Scientific Publication; Apr. 11, 2002; pp. 1-13; Pasadena, California, United States.
Dooling, Dave; ZBLAN Contunues to Show Promise; Website Article; Feb. 5, 1998; http://science.nasa.gov/science-news/science-at-nasa/1998/msad05feb98_1/.
Tucker, Dennis; Horack, John M.; ZBLAN Research Takes Step Forward; Website Article; Jun. 3, 1997/Oct. 29, 1997; http://science.nasa.gov/science-news/science-at-nasa/1997/msad03jun97_1/.
Tucker, D.; Effects of Microgravity on ZBLAN Optical Fibers Utilizing a Sounding Rocket; Journal Article; Jul. 12, 1996; vol. 2809; Proc. SPIE, Space Processing of Materials.

* cited by examiner

*Primary Examiner* — Robert Tavlykaev
(74) *Attorney, Agent, or Firm* — Hulsey, P.C.

(57) ABSTRACT

An apparatus used for the fabrication of fiberoptic waveguides utilizing a novel melting and resolidifying apparatus and method while under microgravity conditions is disclosed. In one embodiment, the optical fiber core has a lower melting point than the cladding and the core is melted and resolidified under microgravity conditions. The molten lower melting point core is thus contained by the higher melting point cladding while under microgravity conditions.

10 Claims, No Drawings

METHOD AND APPARATUS FOR PROCESSING OPTICAL FIBER UNDER MICROGRAVITY CONDITIONS

CROSS-REFERENCE TO RELATED APPLICATIONS

This application claims the benefit of priority to U.S. provisional patent application No. 61/961,304 entitled "Method and Apparatus for Melting and Resolidifying ZBLAN Optical Fiber Under Microgravity Conditions" filed Oct. 10, 2013.

FIELD

This disclosure relates generally to the production of fiberoptic waveguides utilizing a novel melting and resolidifying apparatus and method while under microgravity conditions.

BACKGROUND

It is well known in prior art of the superior light transmission properties of ZBLAN fiberoptic waveguides (a.k.a. fiber) as well as its application in fiber lasers and amplifiers. Unfortunately, all ZBLAN fiber-forming methods involve fabrication from a melt, which creates inherent problems such as the formation of bubbles, core-clad interface irregularities and inclusions. The ZBLAN fiber drawing process generally occurs at 310° C. in a controlled atmosphere (to minimize contamination by moisture or oxygen impurities which significantly weaken the fiber) using a narrow heat zone compared to silica glass. Drawing is complicated by a small difference (only 124° C.) between the glass transition temperature (approximately 260° C.) and the melting temperature (approximately 310° C.). As a result, ZBLAN fibers often contain undesired crystallites. It is known that the crystallite concentration can be reduced or eliminated by melting and resolidifying ZBLAN in zero gravity (a.k.a. microgravity). The theory is that microgravity conditions reduce convection processes that cause crystallite formation in ZBLAN glasses.

The disclosed subject matter helps to avoid this and other problems.

Known art, such as French patent application Nos. 76.18878 and 77.09618, discloses fabricating a ZBLAN optical fiber in 1 G (normal gravity). However, such known methods of fabricating ZBLAN optical fibers often contain undesired crystallites. These optical fibers may suffer from reduced light transmission and, in the case of use in fiber lasers, undesirable heat generation and an associated upper power limit.

Known art, such as U.S. Pat. No. 2,749,255 by Nack, et. al., discloses cladding a glass fiber with a higher melting temperature cladding via a cladding system comprised of a fiber metalizing system employing nickel carbonyl or gas plating methods. The advantage of this gas plating method is that the metallic cladding (e.g. nickel plating) deposition occurs at a lower temperature (approximately 180-250° C.) than, for example, the ZBLAN glass transition temperature (approximately 260° C.) and the melting point of the ZBLAN glass material (approximately 310° C.)

Additional known art, such as U.S. Pat. No. 5,991,486 by Braglia, discloses an optical fiber that has the core made of a rare earth doped non-oxide glass and cladding made of an oxide glass. The glass of the core has a melting temperature lower than that of the glass of the cladding and lying within the range of the softening temperatures of the cladding. To produce the fiber, a preform, obtained by introducing an element made of the non-oxide glass into the hole of a capillary tube made of the oxide glass, is brought to a temperature lying within the range of softening temperatures of the oxide glass and not lower than the melting temperature of the non-oxide glass, and is drawn. The capillary tube, during the drawing process, serves as a container for the molten glass of the core.

SUMMARY

The disclosure relates to an improved apparatus and method for the production of transparent fiberoptic waveguide materials (e.g. ZBLAN) utilizing a novel melting and resolidifying process while under microgravity conditions, and to this end the apparatus is provided with means for manufacturing specially clad optical fiber under normally controlled conditions and, while under the influence of microgravity (e.g. free fall or on-orbit conditions), melting and resolidifying the optical fiber core to eliminate any imperfections in said optical fiber core caused by solidification in a gravity environment.

The advantage of using the invention is the provision of a novel means of cladding an optical fiber core with a higher melting temperature cladding to permit easy handling (e.g. spooling or bundling) and optical fiber core melting/resolidification of a compact and contained assembly under microgravity conditions.

An additional advantage is that the optical fiber can be clad during conventional controlled condition fabrication (i.e. fiber drawing) with a cladding that is of a higher melting temperature than the core ZBLAN material, it being a particular feature of the invention that the cladding is either a glass cladding of higher melting temperature or a vapor deposited higher melting temperature metal cladding or a combination of the two. After cladding is accomplished, the fiber may be wound on a spool, stretched out in strands, bundled in strands, etc., placed in a furnace assembly and exposed to microgravity conditions. While under microgravity conditions, the furnace is activated and the temperature applied is just enough to melt the ZBLAN fiber core but not enough to melt the outer cladding layer(s). The furnace is then allowed to cool over a period of time, while still under microgravity conditions, thus permitting the ZBLAN fiber core to resolidify under microgravity conditions. This method provides a superior transparent ZBLAN product, eliminating any imperfections in said optical fiber caused by solidification in a gravity environment.

Another advantage offered by the inventive means is the provision of manufacturing the ZBLAN fiber under controlled conditions, exposing it to microgravity conditions, melting, resolidifying and stripping the cladding material from the core ZBLAN fiber without harming the core ZBLAN fiber or exposing it to harmful moisture.

A further advantage of this method is that it permits individual samples (e.g. 1 meter lengths) of fiber to be processed by first melting the core material and exposing the fiber to microgravity conditions (i.e. a drop tower, aircraft parabolic flight or suborbital flight) for a very short period (e.g. on the order of 1 second to 5 minutes) and rapidly (e.g. on the order of 1 second to 5 minutes) resolidifying the core material under microgravity conditions. This is possible due to the low thermal mass of each piece of fiber. The rapid cooling may be accomplished by some well-known means of quenching (e.g. air blast, refrigerant blast, liquid immersion, etc.). Thus, the fiber samples may be processed under microgravity conditions without the need for transporting to orbit.

DETAILED DESCRIPTION

In one embodiment, the apparatus of the invention includes fabricating a ZBLAN fiber on Earth via many well-known means in the prior art (e.g. French patent application Nos. 76.18878 and 77.09618) and then cladding the fiber with a higher melting temperature cladding via a cladding system comprised of a fiber metalizing system described for example in U.S. Pat. No. 2,749,255 and other systems well known in the art employing nickel carbonyl or gas plating methods. The advantage of this gas plating method is that the metallic cladding (e.g. nickel plating) occurs at a lower temperature (approximately 180-250° C.) than the ZBLAN glass transition temperature (approximately 260° C.) and the melting point of the ZBLAN core material (approximately 310° C.). This plating method provides a cladding that permits the fiber to be wound on a spool, individual strands can be bundled and heated en masse or the fiber can be transported past a zone heater (e.g. in the fashion of a reel to reel magnetic tape recorder) to melt the ZBLAN core at a temperature of 310° C. without melting the cladding material (e.g. nickel with a melting temperature of 1455° C.) thus preventing the ZBLAN fiber from adhering to itself while coiled on a spool and melted under microgravity conditions in any simple furnace well known in the art.

The advantage of spooling/bundling the clad optical fiber and melting the optical fiber core on the same spool/bundle versus drawing the fiber from a preform under microgravity conditions is that it provides the highest packing density (i.e. most processed material in the least amount of volume) possible as well as providing an extremely simple and totally automatic on-orbit processing (i.e. melting and cooling system) apparatus. Both advantages are critical for processing under microgravity conditions since volume and mass as well as time are limited resources for space missions or free fall situations.

Another advantage of this process is that the metallic cladding can be removed by simply exposing the metallic clad fiber to an atmosphere of carbon monoxide gas heated to approximately 130° C., whereupon the nickel cladding combines with the carbon monoxide to form nickel carbonyl gas and is stripped from the optical fiber. After removal of the metallic cladding, the remaining optical fiber can then be clad with any material desired (e.g. a UV curable polymer).

While nickel carbonyl is cited as the preferred metallic cladding material, other metallic plating materials that are useful in the plating or metallization of the materials described include copper acetyl acetonate; the nitrosyls (nitrosyl carbonyls, for example); cobalt nitrosyl carbonyl; hydrides (such as antimonyhydride or tin hydride); metal alkyls; chromyl chloride; and carbonyl halogens (for example, osmiumcarbonyl broniide, ruthenium carbonyl chloride, and the like).

In another embodiment, an optical fiber is provided whose core is made of a rare earth doped, non-oxide glass (e.g. ZBLAN), wherein the cladding is made of an oxide glass and wherein, furthermore, the core is made of a glass whose melting temperature is lower than that of the cladding glass and lies within the range of softening temperatures of the latter.

The term "range of softening temperatures" means, in this description, the temperature range between the glass transition temperature Tg (where the glass has a viscosity of $10^{12}$ Pa·s) and the temperature at which the glass has a viscosity of $10^4$ Pa·s (viscosity at which the "gob" falls down by gravity and the fiber can be drawn with minimum force).

A fiber of this kind eliminates the cladding melting issue, mechanical resistance and chemical inertia problems of fibers completely made of non-oxide glass, since the cladding (which, for example, makes up most of the material of the single mode fiber) is made of an oxide glass.

Important aspects to be taken into account in choosing the two glasses to be used in a fiber of this kind are given by the thermal expansion coefficient and by the refractive index of the glasses themselves. Specifically, the two glasses must have, at temperatures lower than the glass transition temperature, essentially similar thermal expansion coefficients as well as compatible viscosities, in order to prevent the cladding from inducing stresses on the core or vice versa while the fiber being drawn cools off. In regard to refractive indexes, they must be such that the numerical aperture allows obtaining cores whose radius is in the required order of magnitude. The numerical aperture is given by $NA=(n_1^2-n_2^2)^{1/2}$, with $n_1$, $n_2$ being the refractive indexes of the core and of the cladding respectively, and it is linked to radius r of the core and to wavelength $\lambda$ by the relation $\lambda=2\pi r \cdot NA/2.405$. Suitable numerical apertures range between 0.3 and 0.5.

Non-oxide glasses which can be used in the presence of an oxide glass cladding can be, for instance, ZBLAN glasses, chalcogenide glasses, aluminum fluoride glasses, or phosphate-fluoride glasses.

These glasses have glass transition temperatures Tg ranging from a minimum of about 265° C. (for ZBLAN) to a maximum of about 475° C. (for glasses containing Ba), melting temperatures in the order of 700-740° C., thermal expansion coefficients $\alpha$ (for temperatures lower than Tg, particularly temperatures in the range 30 to 300° C.) ranging from a minimum of about $11 \cdot 10^{-6}$ °C.$^{-1}$ (for glasses containing Ba or As) and a maximum of about $19 \cdot 10^{-6}$ °C. (for ZBLAN), and refractive index ranging from 2 to about 2.5.

Oxide glasses with glass transition and melting temperatures, thermal expansion coefficients, viscosities and refractive indexes compatible, for the purposes of the present invention, with those of the aforesaid non-oxide glasses are specifically lead silicate glasses with high lead oxide content, preferably between 30% and 70% (molar percentages), whose refractive index varies from 1.69 to 2.14. In choosing the specific composition, it should be kept in mind that glasses whose lead oxide content is close to the upper limits of the range have thermal expansion coefficients which are very similar to those of chalcogenide or ZBLAN glasses and refractive indexes yielding the required numerical aperture for the fiber, but they may have excessively low glass transition temperatures. By contrast, glasses whose lead oxide content is close to the lower limits of the range have suitable glass transition temperatures but may have excessively low thermal expansion coefficients and refractive indexes. Glasses whose lead oxide content is within the preferred range represent, in any case, a good compromise solution, also taking into account that any stresses induced in the drawing process can be eliminated with an annealing operation at temperature lower than the glass transition temperature Tg of the core glass.

Alternatively, instead of binary $SiO_2$—PbO glasses, lead silicate glasses also containing minor percentages of additional oxides, e.g. $TiO_2$, can be used. The presence of these additional oxides allows, as is well known to the person skilled in the art, modifying the characteristics of a lead silicate glass in order to obtain the required compatibility of all parameters of interest in the two glasses.

Glasses containing oxides of the $M_2O_5$ type, where M is Nb or Ta, instead of PbO, are also suitable. The refractive indexes of said glasses also exceed 2.

Further details of other suitable glasses can be found in U.S. Pat. No. 5,991,486.

The invention also provides a method for the fabrication of the aforesaid fiber, wherein a preform comprising a cladding and a core is drawn, in which the ratio between the diameters corresponds to that required to obtain the desired optical fiber. According to the invention for preform production an oxide glass capillary tube is used as cladding, into the interior of which there is introduced an element of non-oxide glass (e.g. ZBLAN), whose melting temperature is lower than that of the oxide glass and lies within the range of softening temperatures of the latter, and, for the drawing process, the preform is brought to a temperature lying within said range and not lower than the melting temperature of the non-oxide glass.

The non-oxide glass element can be introduced into the capillary in its molten state, by capillarity or by pouring, or in its solid state, in the form of a rod.

As can be clearly seen, with the described method the fiber is obtained either by starting from the non-oxide glass already in its molten state, or by drawing a cold-formed preform.

The glasses used have preferably melting temperatures (for the non-oxide glass) and softening temperatures (for the oxide glass) ranging between about 700° and 750° C., and such refraction indexes as to give rise, in the drawn fiber, to a numerical aperture ranging between 0.3 and 0.5. Further prior art details of drawing glass clad fibers using this method can be found in U.S. Pat. No. 5,991,486.

Additionally, the aforementioned method of coating the fiber with metal may be used to apply metal over the aforementioned glass cladding to completely eliminate the possibility of glass cladding adhering to itself during the core melting operation. As stated earlier, the metallic cladding can be removed by simply exposing the metallic clad fiber to an atmosphere of carbon monoxide gas heated to approximately 130° C. whereupon the nickel cladding combines with the carbon monoxide to form nickel carbonyl gas and is stripped from the optical fiber. After removal of the metallic cladding, the remaining optical fiber can then be clad with any material desired (e.g. a UV curable polymer).

The aforementioned processes also have the advantage of eliminating any exposure to water, water vapor or aqueous solutions, all of which will potentially damage the fiber core.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. An optical fiber system comprising:
   a drawn precursor fiber comprising:
      a precursor core material having a first melting point temperature;
      a cladding material encompassing said precursor core material, said cladding material having a second melting point greater than the first melting point;
   a furnace, said drawn precursor fiber stored in said furnace in a defined arrangement, said defined arrangement being selected from the group consisting of: a spool, stretched out in strands, and bundled in strands;
   said furnace operable to perform:
      heating of said drawn precursor fiber to a temperature greater than said first melting point and less than said second melting point to provide a molten precursor core material contained by the cladding material; and
      cooling said molten precursor core material under microgravity conditions to re-solidify said precursor core material to form a second glass structure, wherein said second glass structure comprises fewer imperfections than said precursor core material.

2. The optical fiber system of claim 1, wherein said core material is composed of ZBLAN.

3. The optical fiber system of claim 1, wherein said cladding is composed of metal.

4. The optical fiber system of claim 1, wherein said cladding is composed of glass.

5. The optical fiber system of claim 1, wherein said cladding is composed of glass and metal.

6. The system of claim 1, wherein said defined arrangement of said drawn fiber is maintained during the heating of said drawn precursor fiber.

7. A method of producing a reduced imperfection optical fiber, said method comprising:
   forming a drawn precursor fiber comprising a precursor core material and a cladding material, said cladding material encompassing said precursor core material, said precursor core material having a first melting point, said cladding material having a second melting point higher than the first melting point;
   storing said drawn precursor fiber in a defined arrangement, said defined arrangement being selected from the group consisting of: a spool, stretched out in strands, and bundled in strands;
   heating the drawn precursor fiber to a temperature greater than said first melting point and less than said second melting point to provide a molten precursor core material encompassed by the cladding material; and
   cooling said molten precursor core material under microgravity conditions to re-solidify said precursor core material to form a second glass structure core material, wherein said second glass structure core material comprises fewer imperfections than said first precursor core material.

8. The method of claim 7, wherein said defined arrangement of said drawn fiber is maintained during the heating and cooling of said drawn precursor fiber.

9. An improved optical fiber produced by:
   forming a drawn precursor fiber comprising a precursor core material and a cladding material, said cladding material encompassing said precursor core material,
   said precursor core material having a first melting point, said cladding material having a second melting point higher than the first melting point;
   storing said drawn precursor fiber in a defined arrangement, wherein said defined arrangement is selected from the group consisting of: a spool, stretched out in strands, and bundled in strands;
   heating the drawn precursor fiber to a temperature greater than said first melting point and less than said second melting point to provide a molten precursor core material encompassed by the cladding material; and
   cooling said molten precursor core material under microgravity conditions to re-solidify said precursor core material to form a second glass structure core material, wherein said second glass structure core material comprises fewer imperfections than said first precursor core material.

10. The system of claim 9, wherein said defined arrangement of said drawn precursor fiber is maintained during the heating of said drawn precursor fiber.

* * * * *